US006506445B2

(12) United States Patent
Popat et al.

(10) Patent No.: US 6,506,445 B2

(45) Date of Patent: Jan. 14, 2003

(54) IMAGE TRANSFER SHEETS AND A METHOD OF MANUFACTURING THE SAME

(75) Inventors: Ghanshyam H. Popat, Ridgecrest, CA (US); Shiaonung Su, Pasadena, CA (US); Thomas Mammen, Brea, CA (US); Frederick Miekka, Sierra Madre, CA (US); Andre Saint, Buffalo, NY (US); Brett Ulrich, South Wales, NY (US); Omar Attia, Lake View, NY (US)

(73) Assignee: Avery Dennison Corporation, Brea, CA (US)

( * ) Notice: Subject to any disclaimer, the term of this patent is extended or adjusted under 35 U.S.C. 154(b) by 0 days.

(21) Appl. No.: 09/905,845

(22) Filed: Jul. 13, 2001

(65) Prior Publication Data

US 2002/0029843 A1 Mar. 14, 2002

Related U.S. Application Data

(60) Division of application No. 09/071,785, filed on May 1, 1998, now Pat. No. 6,277,229, which is a continuation-in-part of application No. 09/030,664, filed on Feb. 25, 1998, now abandoned, and a continuation-in-part of application No. 08/892,187, filed on Jul. 14, 1997, now Pat. No. 6,080,261, and a continuation-in-part of application No. PCT/US96/13908, filed on Aug. 26, 1996, and a continuation-in-part of application No. 08/519,570, filed on Aug. 25, 1995, now abandoned.

(51) Int. Cl.[7] .......................... B41M 3/12; B41M 3/00; B05D 5/10; B44C 1/175; B32B 9/00

(52) U.S. Cl. ....................... 427/146; 427/147; 427/149; 427/208.8; 427/514; 427/516; 156/230; 156/236; 156/239; 156/240; 156/247; 156/277; 156/289; 428/41.9; 428/42.1; 428/42.3; 428/202; 428/214; 428/350; 428/352; 428/914

(58) Field of Search ................................ 156/230, 234, 156/236, 237, 239, 240, 241, 247, 277, 289, 540; 427/146, 147, 148, 149, 207.1, 208.2, 208.8, 508, 514, 516; 428/41.7, 41.9, 202, 214, 350, 352, 354, 914, 915, 42.1, 42.3

(56) References Cited

U.S. PATENT DOCUMENTS

| | | | | | |
|---|---|---|---|---|---|
| 4,785,313 | A | * | 11/1988 | Higuma et al. | 346/135.1 |
| 4,812,541 | A | | 3/1989 | Mallya et al. | |
| 5,659,972 | A | | 8/1997 | Min et al. | |
| 5,795,425 | A | * | 8/1998 | Brault et al. | 156/235 |
| 5,984,467 | A | * | 11/1999 | Bodager et al. | 347/101 |

* cited by examiner

*Primary Examiner*—Jerry A. Lorengo
(74) *Attorney, Agent, or Firm*—Oppenheimer Wolff & Donnelly, LLP

(57) ABSTRACT

A versatile method for the manufacturing of image transfer sheets which provide users with cold transferring images without using supplemental heat in the course of image transfer to a wide variety of substrates includes printing an image with water-based ink onto an image transfer sheet that has a coating of water-accepting adhesive. A method of manufacturing image transfer sheets includes first applying a water impermeable layer onto a flexible substrate. A layer of water-activatable adhesive is applied upon the water impermeable layer. The adhesive is then dried in a dryer with dehumidified air. A water permeable detack layer is then applied upon the layer of adhesive. In a particular embodiment, the sheet further includes a water-accepting image holding layer in between the water-accepting adhesive layer and the water impermeable layer. The image holding layer becomes water-resisting when heated to within a range of activation temperatures.

42 Claims, 4 Drawing Sheets

IMAGE TRANSFER SHEETS AND A METHOD OF MANUFACTURING THE SAME

RELATED APPLICATIONS

The present application is a divisional of U.S. patent application Ser. No. 09/071,785, which is now issued as U.S. Pat. No. 6,277,229. This application is a continuation-in-part of U.S. patent application Ser. No. 08/519,570, which was filed Aug. 25, 1995 now abandoned, and 08/892,187, which was filed Jul. 14, 1997 and which has issued as U.S. Pat. No 6,080,261, and of PCT Application No. PCT/US96/13908, which was filed on Aug. 26, 1996, and its counterpart in the United States, U.S. Ser No. 09/030,664, filed Feb. 25, 1998 now abandoned, all of the foregoing patents and patent applications being incorporated herein by reference in their entirety. The present application also incorporates by reference a related patent application that was filed simultaneously herewith, entitled "Water-Activatable Polymers For Inkjet-Imprintable Constructions,"U.S. patent application Ser. No. 09/71,502, now issued as U.S. Pat. No. 6,124,417.

FIELD OF THE INVENTION

The present invention relates to media for transferring images and, in particular, to an image transfer sheet and a corresponding method for using the sheet in conjunction with ink jet printers.

PRIOR ART

Human beings have long been fascinated with transferring images from one media to another. In the 1960's, children and adults alike used Silly Putty® to transfer images onto a wide range of other surfaces. One common example of this technique was to use Silly Putty® to transfer colored comics from the Sunday newspaper to another surface. A person would roll the Silly Putty® on the comic to transfer the image from the paper to the surface of the Silly Putty®. The Silly Putty® would then be rolled onto another surface to transfer the comic to a surface such as a countertop.

The Silly Putty® approach worked fine for temporarily transferring comics or other images onto a limited range of hard surfaces, but not onto less rigid surfaces such as fabric T-shirts, for example. To transfer an image onto a T-shirt, an individual had to purchase a pre-printed iron-on transfer sheet. To use this product, the purchaser would place the sheet image-side-down onto a T-shirt and then iron the sheet to transfer the image onto the fabric of the shirt.

Iron-on image transfer sheets had a number of limitations, however. First, since the sheets were pre-printed, individuals purchasing these products were limited to selecting from a narrow range of standard image designs. The individual could not be creative and design their own image.

Second, these products required the end-user to be somewhat skilled when transferring the image onto the desired substrate, such as a T-shirt. If the end-user did not hold the image transfer sheet perfectly still while ironing it, the image on the shirt was blurred. Thus, the end result was that an individual using these products had to be satisfied with an end-product that did not meet their aesthetic criteria, or else throw the image-bearing substrate away and start all over again. Thus, these products did not permit the substrate to be re-used.

Another limitation of these products was that they required ironing to transfer the image to the substrate. As an alternative to ironing, images could be transferred to T-shirts and other substrates with a silk-screen process. Typically, silk-screening requires the user to place a custom order with a custom printer. However, by placing a custom order, the individual lost his/her opportunity to directly create his/her own personalized products. Additionally, the expense and time delay in receiving the final end-product were significant disadvantages to placing a custom order.

The image transfer field took a new turn in the 1990's, when ink jet printers became widely popular. T-shirt transfer sheets were developed onto which a user could print a custom image using software installed on a personal computer, then use an ink-jet printer connected to the computer to print out the custom image in reverse form onto the T-shirt transfer sheet. The image on the T-shirt transfer sheet would then be transferred onto a T-shirt by laying the sheet print-side down on the substrate and then ironing the back side of the sheet. The printed image would then appear on the T-shirt. With the introduction of these products people could, for the first time, compose a custom image on their personal computer, then put that image onto a T-shirt using little more than an ink jet printer and an iron.

As examples of commercially available ink jet products for image transfer, Canon now sells an ink jet compatible iron-on T-shirt transfer sheet under the product code TR-101. Similarly, Hanes sells an ink jet compatible iron-on T-shirt transfer sheet under the trade name Hanes T-ShirtMaker. Both the Canon and Hanes sheets require heating the sheet with an iron or other hot device before the image will transfer. As an alternative to printing an image onto the Hanes sheet with an ink jet printer, the user may draw an image directly onto the sheet with special crayons and then iron the crayoned image onto a T-shirt.

While these types of sheets represent a step forward, they have various limitations. Many of the sheets transfer at most only about 60%–80% of the printed ink onto the substrate. Consequently, the colors do not appear as brilliantly on the substrate as they should, and images are not nearly as crisp. Secondly, the image is permanently fixed onto the T-shirt as soon as it has been ironed on. If the user does not like the image, or if the image did not transfer properly, there is no way to remove the image from the substrate. The user must either throw the substrate away and begin anew, or use the product in its flawed state.

A third limitation of these sheets is that the entire image sheet transfers with ironing, even areas that are not printed and that do not contain the image. For example, a circular printed pattern is often ironed on as a large square, leaving an unsightly square edge around the circular printed pattern and unnecessarily stiffening the substrate. As an alternative, the instructions for Canon's product code TR-101 suggest cutting out the printed image from the image transfer sheet as follows:

> "For best results, cut away the unprinted portion of the transfer, coming as close to the printed area as possible. If an unprinted portion of the transfer is applied to the fabric it will cause the fabric to become stiff"

One problem with this approach is that it requires considerable cutting skill on the part of the user. If the user snips a little bit too far, he may cut into and thereby damage the printed image. If the image is at all intricate, considerable time may be necessary to cut about the image, and it may be impossible to remove the unprinted central portion of the transfer. Also, if the cut is not perfect, the unprinted area about the edge of the image may have an uneven, unsightly appearance once transferred to the substrate.

Fourth, the transfer sheets are generally designed to transfer images only with simultaneous heat transfer and fixing. This imposes an additional limitation as the user is frequently limited to selecting those fabrics or other surfaces that can accept the simultaneous heat transfer and fixation without being damaged. There are many instances when a user wants to transfer a custom-printed image onto surfaces that cannot be heated. For example, custom designed images and/or phrases cannot be ironed onto an automobile, or onto other surfaces such as glass windows, three-ring binders and tiles, to name a few. Other surfaces that are desirable for image transfer include paper of various types, file folders, report covers, sheet protectors, plastic and vinyl binders, glass, mirrors, cardboard, stainless steel, aluminum, painted metal, wood, ceramics, FORMICA™, furniture, overhead transparencies, toys, and a wide variety of other surfaces.

Another drawback with some of the prior art T-Shirt image transfer sheets is that even after the image has been transferred, the shirt must be washed in a vinegar bath in order to set the image. The requirement of making the image permanent by immersing the image-bearing substrate into a vinegar bath adds yet another step to a complicated and hazardous process.

SUMMARY OF INVENTION

It is an object of the present invention to advance the art of image transfer sheets generally, and to overcome at least some of the problems in the prior art. The invention encompasses several embodiments of an image transfer sheet, and a method for manufacturing such sheets.

According to one aspect of the present invention, a cold image transfer process using no supplemental heat in the course of image transfer has a first step of forming an image transfer sheet having the following successive layers: a) a release-coated liner sheet; b) a layer of substantially water-accepting adhesive; and c) an ink jet transmissive detackifying ("detack") layer. An image is applied to the image transfer sheet from an ink jet printer. The image sheet is applied to a substrate at ambient temperature with the adhesive bonding directly to the substrate. The release-coated liner is then removed.

According to another aspect of the present invention, a wet coating of water-activatable adhesive is applied to a flexible substrate. The substrate is placed in an oven or dryer in order to dry the adhesive. Dehumidified air may be pumped into the oven in order to speed the drying process and thereby increase the rate of production and/or reduce the temperature of the oven without increasing drying time. A water-permeable detack layer may then be coated on the outer exposed surface of the adhesive layer to form the final construction. A printing press may be used to print one or more thin layers of the water-activatable adhesive and/or water-permeable detack layer onto a flexible backing sheet.

In one contemplated embodiment of an image transfer sheet, a water-activatable adhesive is first printed or coated onto a flexible backing layer, with the water-accepting adhesive being removable from the backing layer. The image transfer sheet has a water-impermeable layer in between the adhesive and the backing layer. The sheet may also have an optional detack layer that is applied onto the layer of adhesive, the layer of adhesive being in-between the detack layer and the flexible backing layer.

Different embodiments may include various additional features. The sheet may include a water-impermeable layer with the water-activatable adhesive being coated on the outer surface of the water-impermeable layer. The flexible substrate may alternatively be a paper that is release-coated on the side of the sheet to which the water-activatable adhesive is applied. The sheet may include a pigmented, colored, tinted, or reflective water-permeable layer in between the detack coating and the adhesive layer, where dyes, tints, pigments and metallic flake pigments such as malachite green, titanium dioxide, calcium carbonate, powdered aluminum and aluminized polyethylene terephthalate (Mylar) are used to create the effect desired. At least a portion of the water-activatable adhesive layer and the water-permeable detack layer are together removable from the flexible substrate. The water-impermeable layer may be a varnish. The detack layer may comprise a mixture of polyvinyl alcohol (PVOH), polyacrylic acid (PAA) and starch. Alternatively, the detack layer is optional in some embodiments in which the adhesive is not tacky prior to printing. The adhesive layer may include acrylic copolymers, in which the copolymers are formed from a mixture of monomers comprising (a) one or more alkyl acrylates, (b) methyl acrylate, (c) vinyl acetate, and (d) methacrylic acid and/or acrylic acid.

According to another aspect of the present invention, an image transfer sheet is provided that permits the user to apply the image to a substrate, then decide whether to permanently bond the image to the substrate or to remove the image. For example, one versatile method includes printing an image onto one sheet from the supply with a water-based ink, thereby activating the adhesive only in the areas onto which water-based ink has been printed. The sheet is then applied to a first substrate to adhere the image to the substrate. After applying the sheet to the first substrate, the sheet is pulled off of the substrate to leave the portions of adhesive that bear the image attached to the substrate but leaving the portions of the adhesive that do not bear the image attached to the sheet.

At this point, if the user decides that the resulting image does not meet his/her aesthetic requirements or otherwise wants to remove the image, the user may do so. A second image is then printed onto another, second sheet of the image transfer sheet supply with a water-based ink, thereby activating the adhesive of the second image transfer sheet only in the areas of the second image transfer sheet onto which the water-based ink has been printed. That second image transfer sheet is then applied to the substrate to adhere the image to the substrate. After applying the sheet to the substrate, the sheet is pulled-off of the substrate to leave the portions of adhesive that bear the image attached to the substrate, but leaving the portions of the adhesive that do not bear the image attached to the sheet. If the user is now satisfied with the image, and where the substrate is capable of being heated by some heat source, the user may apply heat to the image-bearing substrate thereby making the image permanent and water-fast In this way, a user sometimes makes an image permanent on the substrate by heating the image on the substrate. At other times the user does not heat the image, so that the image is only temporarily attached to the substrate and is ultimately removed therefrom. The stack of sheets that accept the images can therefore be used for a dual purpose: for the temporary transfer of images and/or for the permanent transfer of images, a feature not contemplated by the prior art.

The image-accepting sheet may be used for a variety of purposes. One such purpose is the production of multiple transferable images on a single sheet. The addition of a plurality of perforation lines on the sheeted stock results in the formation of a plurality of substantially rectangular or square portions. Thus, using software such as Avery Dennison's Avery Kid's or Printertainment Software to create a plurality of images on a computer screen, the user can print a multiplicity of images on the image-accepting sheet, with one or more images being printed on each rectangular or square portion of the image-accepting sheet to create an end-product sheet having a variety of separable, transferable images. The rectangular portions may then be separated with the aid of the perforation lines after the images have been printed onto the sheet. Other varieties of perforation shapes may be employed depending on the purpose for which the images will be used. For example, the sheet may be pre-die-cut or perforated to form a plurality of circles, squares, ovals, rectangles, etc. or a mix thereof. Smaller images may be transferred to baseball caps, shirt sleeves, pockets, doll clothes, household items such as pot holders, and the like. A second advantage of perforating the sheet is to allow the end-user to maximize the printable area of the sheet by permitting the end-user to print and then separate out the multiple images on a single sheet, thus avoiding any waste. As an alternative, the composite sheet could be die-cut, or scored, or otherwise provided with lines of weakness in order to replace some or all of the perforation lines. Further, the present invention is applicable to laminated sheet assemblies.

According to one embodiment of the present invention, a sheet for transferring an image that has been printed onto the sheet with a water-based ink has a flexible backing layer. A water-impermeable layer is coated or printed on to the backing layer. A water-accepting layer that includes a water-activatable adhesive is then printed onto the water-impermeable layer, the water-accepting layer being removable from the water-impermeable layer. A detack layer is then applied by printing or coating means onto the water-accepting layer.

The sheet may also have a variety of other features. For example, the sheet may include a water-permeable colored, tinted, pigmented or reflective (or some combination thereof layer in between the detack layer and the water-accepting layer. The sheet may have a water-permeable layer of cross-linker in between the detack layer and the water-accepting layer, wherein the water-accepting layer becomes water-resisting when water-based ink flows through the layer of cross-linker and into the water-accepting layer.

There are several contemplated approaches to making the image permanent or fixed. In one approach, the activated cross-linker can migrate into the pressure-sensitive adhesive to chemically fix the image. In this mode, the ink acts as the carrier facilitating the migration of the cross-linker into the adhesive. In another approach, a heat-activatable cross-linker may be added directly to the adhesive. Once activated, the cross-linker fixes the image. In yet another approach, a water-accepting layer that is initially porous to the ink, may on heat treatment, become non-porous and water-resisting thereby fixing the image. In this mode the water-accepting layer may comprise both adhesive and cross-linker. As a further alternative, an image transfer sheet may be provided having a water-permeable layer of adhesive coated or printed on the outer surface of a water-accepting image-holding layer. The adhesive acts to temporarily bond the image-holding layer to a substrate. To permanently bond the image holding layer to the substrate, the user heats the image-holding layer to make the image-holding layer water-resisting.

Other objects and features of the invention will become apparent from a review of the Detailed Description below, from the drawings, and from the claims.

DETAILED DESCRIPTION OF THE PREFERRED EMBODIMENT

There are several embodiments of the present invention, each with particular features. However, the presently preferred embodiments have certain features in common. For example, each embodiment relates to a sheet for transferring an image that an ink jet printer has printed onto the sheet. In several of the embodiments, there is a detack layer on the surface of each sheet that prevents the sheet from becoming tacky until an image is printed thereon. The detack layer (also known as a non-tack layer) also serves to prevent the adhesive from sticking to the rollers of the printer or otherwise gumming up printer elements as the sheet travels through the printer.

Figure 1:
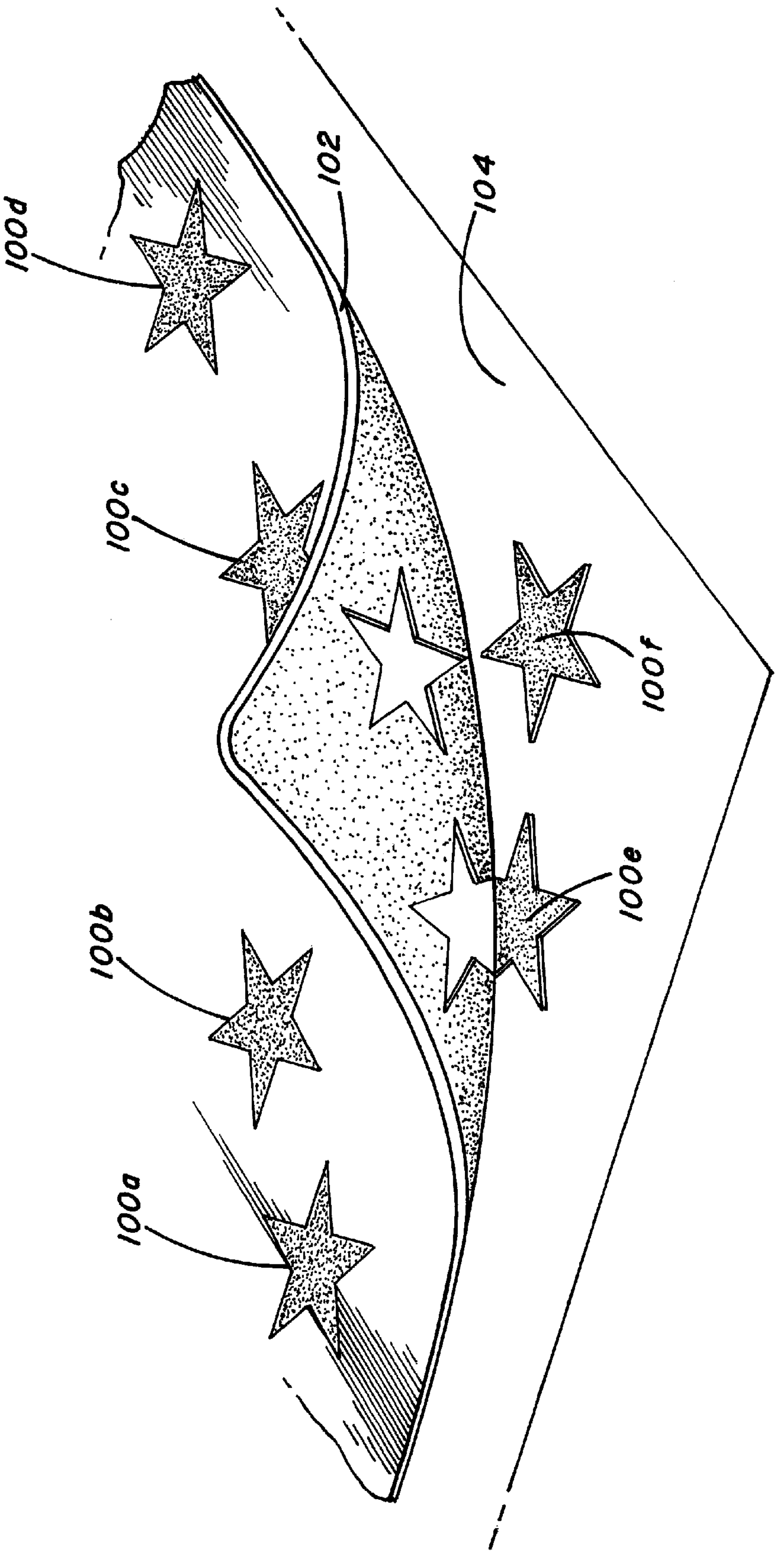
FIG. 1 illustrates images that have been printed onto an image transfer sheet being transferred onto a substrate, with the printed areas being transferred but the unprinted areas remaining attached to the image transfer sheet.

The preferred embodiments are formulated so that only the printed image transfers onto the end substrate. The portions of the sheet that are not printed do not adhere to the end substrate, so that only the image itself is transferred. Referring to FIG. 1, a series of stars 100*a–f* have been printed onto an image transfer sheet 102 according to the present invention. For purposes of illustration, the transfer sheet 102 is provided with a transparent backing sheet through which the printed stars 100*a–f* may be seen.

The ink from the ink jet printer makes the sheet tacky where the stars are printed. When the user applies the sheet to a surface 104 and then removes the sheet, the printed stars 100*a–f* remain behind on the surface 104. The areas of the sheet that are not printed do not become tacky, and therefore do not adhere to the surface 104. It should be noted that the surface 104 can be any of a wide variety of surfaces onto which images may be transferred. For purposes of illustration, but not limitation, such surfaces may be notebooks, T-shirts, windows, walls, mugs, plates, doors, glass, ceramics, tile, etc. The current system may be used to place “paper-less” labels on surfaces such as glass, compact discs, and many other surfaces.

EMBODIMENTS FOR TEMPORARILY TRANSFERRING IMAGES

Figure 2:
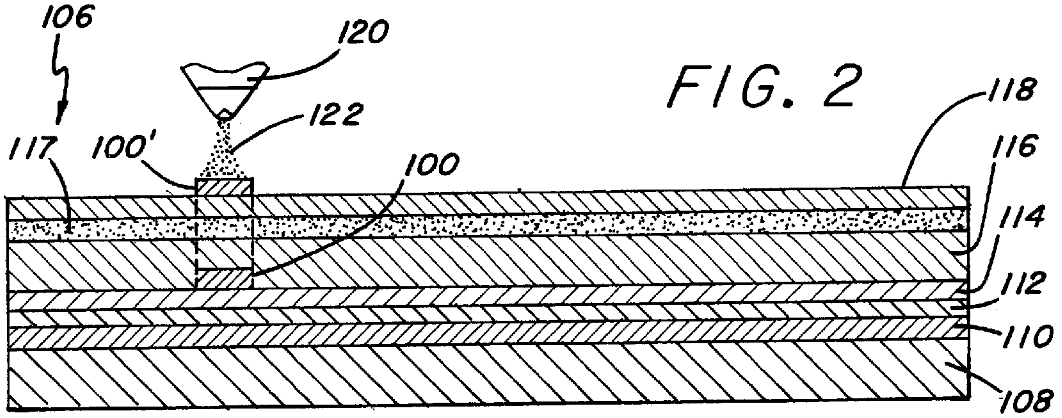
FIG. 2 is a cross-sectional view of an image transfer sheet for temporary transfer of an image to a substrate.

Considering now particular embodiments of the present invention, the image transfer sheet 106 of FIG. 2 includes a paper backing 108 that has a low-density polyethylene (LDPE) coating 110 on one surface. One suitable low density polyethylene ("LDPE")-coated paper is the 92 lb. poly-coated paper, available from Jen-Coat, Inc. of Wesleyan, Mass., currently sold under product code 9LDMT/70 bleached/13LDTL. Of the 92 pound lb. weight, a white release liner paper accounts for 70 lb., a low density polyethylene gloss finish accounts for 13 lb., and a LDPE mafte finish accounts for 9 lb.

A first very thin coating (1 to 5 grams per square meter, $g/m^2$) of ultraviolet ("UV") radiation-curable varnish 112 is applied to the upper face surface of the LDPE coating 110 to provide a smooth, exposed upper face surface of the UV varnish coating.. Preferably, the coating is between 2.5 to 4.5 $g/m^2$. Once applied, the coating is cured by exposure to UV radiation. Suitable UV varnishes are known in the art. One such suitable coating is presently available as Envirocure UV-1801 from Environmental Ink and Coating Corporation in Morgantown, N.C. This particular coating is non-yellowing, offers good flexibility as well as resistance to cracking, provides rapid cure response and good scuff resistance. Alternatively, a thin layer (approximately 0.5 $g/m^2$) of silicone may substitute for the UV varnish layer 112.

A second, separate UV varnish layer 114 that is non-soluble in water is applied to the exposed upper face surface of the smooth, first UV varnish layer 112 and subsequently cured by exposure to UV radiation. The second UV varnish layer 114 acts as a protective layer over the image once the image has been transferred. The second UV varnish layer is somewhat incompatible with the first UV varnish layer. Because layers 112 and 114 are somewhat incompatible, they can be releasably separated from one another along their common boundary in areas where the adhesive adheres to a final substrate. In a preferred embodiment, the release peel force required to separate the two UV varnish coating layers is between approximately 8–14 g/in. (approximately 3 to 6 N/m), as measured using an Instron Universal Tester Model 4501 from Instron (Canton, Mass.) according to a modified version of the standard tape method Pressure-Sensitive Tape Council, PSTC-1 (rev. 1992), Peel Adhesion for Single Coated Tapes 180° Angle, where the peel angle was 90° and the rate of peel was 30 in/min (0.76 m/min). A load cell linked to a computer was used to determine the value reported. The release force range can be varied for different embodiments.

A suitable second UV varnish for layer 114 is available as product code Clear Coating RCA 01291R from Sun Chemical of Rochester, N.Y. This particular product exhibits high gloss and layflatness with excellent release properties when coated on the upper exposed face surface of the first UV varnish layer. The coating is very stable with respect to light and temperature. It should be noted that alternatives to UV varnishes include water-based varnishes, solvent-based varnishes, or other varnishes, such as hot melt varnishes.

A layer of adhesive 116 is applied to the exposed upper face surface of the second UV varnish layer 114. The adhesive is typically water-accepting and may or may not be repulpable. Furthermore, the adhesive, is non-tacky to the touch until activated, and is wateractivatable. Once activated, the adhesive becomes pressure-sensitive. One such adhesive is described in detail in Patent Cooperation Treaty Application No. PCT/US96/13908, which was filed on Aug. 26, 1996, and which is incorporated by reference herein. However, an improved and presently preferred adhesive is described in a U.S. patent application entitled "Water-Activatable Polymers for Inkjet-Imprintable Constructions" of inventor Shiaonung Su, which is filed concurrently herewith and which is hereby incorporated by reference. One embodiment of the improved adhesive includes acrylic copolymers, in which the copolymers are formed from a mixture of monomers comprising (a) one or more alkyl acrylates, (b) methyl acrylate, (c) vinyl acetate, and (d) methacrylic acid and/or acrylic acid.

The presently preferred adhesive is water-activatable, dry to the touch before activation, and is water-accepting so as to accept a water-based ink jet image. It is believed that the water-accepting adhesive once coated and cured as a thin layer is sufficiently porous to the ink jet ink as to permit the aqueous ink jet ink flowing from the detack layer to flow into the water-accepting adhesive. Once the ink has been absorbed by the water-accepting adhesive, the adhesive becomes activated and pressure-sensitive. It is also believed that the water-accepting adhesive rapidly absorbs the aqueous ink jet ink and thus discourages lateral flow within the upper portion of the water-accepting adhesive layer. This results in a printed image that remains crisp and does not "bleed." The adhesive is preferably water-dispersible, repulpable, and cross-linkable, as well as compatible with both dye-based and pigmented inks, and preferably should be both UV- and oxidation-stable. For "photo-realistic" imaging and for use on clear substrates such as glass, the adhesive itself is preferably clear upon drying, although the adhesive may alternatively be milky white, slightly colored or otherwise opaque upon drying in some other applications. It should be understood that adhesives not having all of these preferred qualities at once may be employed within the scope of the invention.

A second layer of adhesive 117 may be printed or coated on the upper face surface of the firstadhesive layer 116. The second layer of adhesive 117 is typically the same adhesive as the first adhesive layer 116, although it is contemplated that the second adhesive layer 117 could be a different adhesive than the first adhesive layer 116 for some applications. The first adhesive layer 116 is typically applied with a coating station, and may have a rough upper surface. It is also contemplated that the adhesive layers 116 and 117 may be applied using any known coating technique, such as Meyer rod coating, die coating, roll coating, and the like. One purpose of the second layer of adhesive 117 is to smooth out any peaks and valleys in the surface of the first coated adhesive layer 116 that may result from the manufacturing process.

Coated on the upper face surface of the printed or coated second adhesive layer 117 is a detack layer 118 that is soluble in water. The detack layer 118 includes three water-soluble ingredients, including polyacrylic acid (PAA), polyvinyl alcohol (PVOH) and starch. By itself, PAA is very hygroscopic with good absorbitivity of water-based inks. In a humid environment, however, the PAA may absorb so much water as to become tacky. Consequently, it may be necessary to mix the PAA with other ingredients to avoid this result.

PVOH is added to form a water-soluble film. One suitable PVOH is sold as Airvol 107 by Air Products and Chemicals, Inc. of Allentown, Pa. Airvol 107 is a water-soluble synthetic polymer made by the alcoholysis of polyvinyl acetate. Airvol 107 combines high tensile strength with ease of film formation.

It should be noted at this point that it is desirable to make the non-tacky detack layer 118 somewhat brittle, so that the printed image will break cleanly away from the non-printed areas of the sheet when the image is applied to the substrate (FIG. 1). A problem with a film made entirely of PVOH is that the film may tend to transfer as a whole during the image transfer. To overcome this deficiency, a water-soluble starch is added to the PVOH layer to increase the brittleness of the layer. The starch must be capable of absorbing water-based inks. The presence of the starch allows the printed image 100 (FIG. 1) to break cleanly at the edge of the image. One suitable starch is Polar Tex-Instant Starch sold by Cerestar USA Inc. of Hammond, Ind. Polar Tex-Instant Starch is a pre-gelatinized, stabilized and cross-linked waxy maize starch (hydroxypropyl di-starch phosphate) with a minimum particle size of 90 microns.

A presently preferred embodiment of the detack layer 118 is applied as 91.4% water, 2.0% Airvol 107 PVOH, 3.0% Carbopol 679 PAA, 3.5% Cerester 12640 Starch, and 0.1% Kathon Biocide LX. The Biocide LX is added as an anti-fungus ingredient to enhance the shelf-life of the end-product. The detack layer 118 as initially applied is approximately 8% to 9% solids. The water is dried, thereby leaving the PAA, PVOH and starch behind. Generally speaking, the detack layer 118 may include between about 1% to 8% PAA, about 1% to 5% PVOH, and about 2% to 10% starch, with the remainder being water.

The detack layer 118 may be specially formulated when the image transfer sheet is to be used to make tattoos. In a presently preferred embodiment, the detack layer for tattoos is 84.4% water, 2.0% Airvol 107 PVOH, 3.5% Cerester 12640 Starch, 10% of a repulpable adhesive dispersion, and 0.1% Kathon Biocide LX. Typical dry detack layer coating weights are from about 0.2 to about 2.0 g/m$^2$. The adhesive, which is the same adhesive used in the adhesive layers applied to the image transfer sheet, is added to provide additional tack to the tattoo to help it adhere better to the skin.

It will be appreciated that the thickness of each of the layers is exaggerated in the accompanying drawings. In practice, image transfer sheets can be prepared as thin sheets or rolls, such as sheets of labels where, for example, the first water-activatable adhesive layer has a thickness of between about 15 to about 60 microns and the flexible backing has a similar dimensional thickness. More preferably, the first and second layers of the water-activatable adhesive have a combined thickness that is sufficiently great as to minimize dot gain—that is, to minimize the lateral movement of a dot of ink imprinted on the image transfer sheet. Although to some degree this is printer-dependent, in general dot gain can be minimized by constructing the image transfer sheets with water-absorbent materials (e.g., the water-activatable adhesive layers plus the detack layer) having a combined thickness of about one mil (about 0.025 mm) or 25 g/m$^{2.}$ The image transfer sheet is non-tacky when dry. The detack layer 118, however, is water-soluble, and the water-activatable adhesive layers 116 and 117 are water-receptive and become tacky when exposed to even a small amount of moisture, such as the water in a water-based ink jet ink. Consequently, when the image transfer sheet is passed through an ink jet printer and imprinted with an image, tacky regions form in the upper layers of the sheet. These layers are thin and water-receptive, and they become activated across their entire cross-sectional thickness, from the exposed upper surface of the detack layer 118 to the interface between the first water-accepting, water-activatable adhesive 116 and the second UV varnish layer 114. Thus, although printed on the detack layer face of the sheet, the sheet becomes tacky all the way through to the second UV varnish layer, which is water-resistant.

FIG. 2 illustrates an ink jet printer 120 printing water-based ink 122 onto the surface of the sheet 106 to form an image 100' on the surface. The ink jet ink dissolves the detack layer 118 in areas where the ink jet ink is printed. The ink then passes through the adhesive layer 116 until it comes into contact with the non-soluble UV varnish layer 114. The adhesive 116 is now activated in the areas in which the water-based ink has come into contact. When the user presses the sheet down onto a surface 104 (FIG. 1), the adhesive adheres to the surface 104 only in the activated areas 100. When the user removes the sheet 106 from the surface 104, the printed image area adheres to the substrate, but the unprinted areas, which have not been activated, remain on the sheet. All or nearly all of the printed ink ultimately transfers onto the substrate, so the color of the transferred image retains the brilliancy and sharpness of the original printed image and the transferred image on the substrate is crisp with little visible or no dot gain.

Note that detack layer 118 and the second UV varnish layer 114 of the construction illustrated in FIG. 2 are brittle. Consequently, both detack layer 118 and the second UV varnish layer 114 will break at the edge of the image as the user pulls the sheet from the image-receiving surface. The end result is that only the image adheres to the substrate, and the remainder of the sheet (including the unprinted adhesive and all the other layers corresponding thereto) pulls away with the backing layers 108, 110 and 112.

The presently preferred adhesive has been tested in preliminary tests on a variety of surfaces. For purposes of illustration rather than limitation, Table 1 summarizes the performance of one embodiment of the adhesive in terms of image quality:

TABLE 1

IMAGE TRANSFER TEST RESULTS

| Test Substrate | Image Quality |
|---|---|
| Xerox Paper | Good |
| Glossy Paper | Good |
| File Folder | Good |
| Report Cover | Good |
| Sheet Protector | Good |
| Vinyl Binder (White) | Good |
| Polypropylene Binder | Poor |
| Glass | Good |
| Mirror | Good |
| Smooth Cardboard | Good |
| Stainless Steel | Good |
| Aluminum | Good |
| Painted Metal | Good |
| Pine Wood | Poor |
| Plywood | Poor |
| Painted Wood | Good |
| Panel Wood | Good |
| Ceramic | Good |
| FORMICA ™ | Good |
| Transparency | Good |
| Cabinet Wood | Good |
| Manila Folder | Good |
| Toys (waxy surface) | Poor |
| Cloth—100% Cotton (T-shirt) | Good |

As indicated in Table 1, the compositions of the present invention facilitated good image transfer to all but four of the test substrates at room temperature. As used herein, a "poor" image transfer occurs when the transferred image is broken and has not transferred properly; "fair" image transfer occurs when the image has a broken border but has otherwise transferred well; and "good" image transfer occurs when the image has transferred intact. Generally speaking, for many surfaces image transfer was improved when the release liner was removed in a fast, fluid motion, as opposed to slowly peeling off the liner from the transferred image.

To evaluate the color quality of images printed on image transfer sheets prepared in accordance with the present invention, and in particular with respect to the embodiment of FIG. 2 as described above, color density tests were conducted with three different ink jet printers: Canon (Bubble Jet) 620, Hewlett Packard 694C, and Epson Stylus 600. In each case, an image transfer sheet ("sample") constructed according to FIG. 2 was fed through an ink jet printer set at 360 cpi and imprinted with a colored image (yellow, cyan, black, or magenta). The image was transferred to a white photocopy paper substrate and evaluated for color density (a measurement of the intensity of light reflected from the printed image, expressed as a dimensionless quantity), using an X-Rite™ densitometer, Model No. 428. For comparison, regular photocopy paper ("paper") was also imprinted with the same colored images and evaluated for color density. High color densities are preferable to low color densities, and a difference of 0.05 units or more is considered significant. The test results are presented in Table 2.

TABLE 2

COLOR DENSITY TEST RESULTS

| | Ink Jet Printer | | |
|---|---|---|---|
| Color | Canon 620 | HP 694C | Epson Stylus 600 |
| Yellow | | | |
| Paper | 0.86 | 0.87 | 0.81 |
| Sample | 0.60 | 0.81 | 1.22 |
| Cyan | | | |
| Paper | 0.99 | 1.08 | 1.10 |
| Sample | 0.75 | 1.09 | 1.42 |
| Black | | | |
| Paper | 1.10 | 1.03 | 1.25 |
| Sample | 1.20 | 1.29 | 2.21 |
| Magenta | | | |
| Paper | 1.04 | 1.05 | 0.99 |
| Sample | 1.21 | 1.14 | 1.56 |

As indicated in Table 2, the image transfer sheets of the present invention were readily imprinted in all three ink jet printers. Images transferred from the sheets were characterized by high color densities, higher even than the densities on plain photocopy paper, for most colors.

Figure 3:
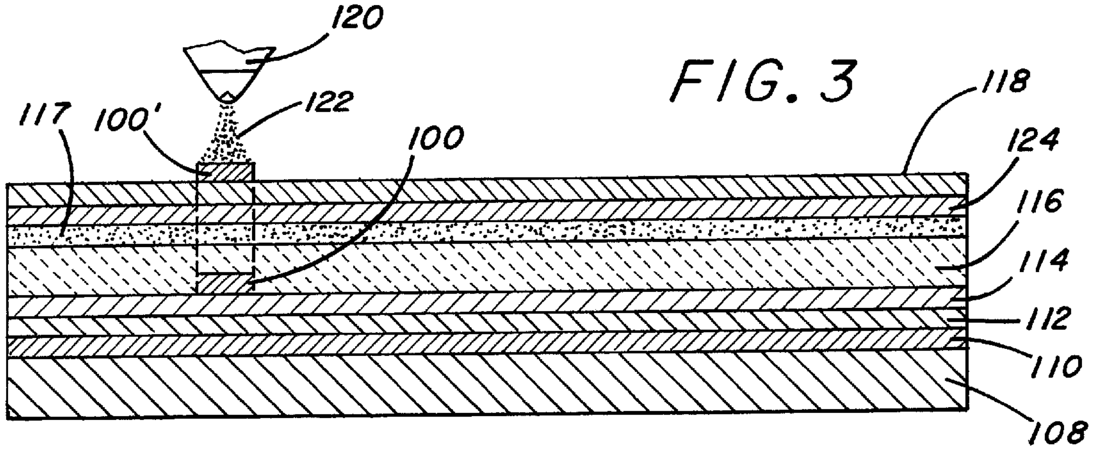
FIG. 3 is a cross-sectional view of another image transfer sheet similar to that of FIG. 2, except that an additional layer has been added, said layer being either colored, tinted, pigmented or a reflective layer or some combination thereof.

Turning now to another embodiment, FIG. 3 illustrates an alternative assembly that includes an optional colored, tinted, pigmented and/or reflective layer 124 to provide a colored, tinted, pigmented and/or reflective background to the printed image. This color layer 124 may be particularly desirable when the assembly is used in conjunction with a dark background, such as on a black notebook. If the color layer 124 is white, for example, the printed image 100 will appear to be against a white background. The composition of the color layer 124 may be any conventional coloring agent, dye or pigment known in the art through which ink jet printer ink will flow. For example, the layer 124 could be a very thin layer of titanium dioxide, for example, to create a white layer.

Another alternative is to include a color agent, dye or pigment in the detack layer 118. For example, to create a white background, titanium dioxide can be added to the detack layer 118. Although titanium dioxide is not permeable to water, the ink jet ink will tend to flow around the titanium dioxide particles and into the first and second adhesive layers 116 and 117. Additionally, a dye may be added to the second UV coating layer 114. The printed image can be seen through the transparent, colored second UV coating layer, but now takes on a colored hue. The transparent color dye can be any suitable dye conventional in the art.

EMBODIMENTS FOR PERMANENTLY TRANSFERRING IMAGES

There are many applications for temporary images, such as for decorating windows and other surfaces for a particular holiday. The embodiments of FIGS. 2 and 3 will generally yield a "temporary" image that can be cleanly removed by washing the image with water. An ordinary household cleaner will normally break up the water-insoluble second UV varnish layer 114 in these two embodiments, and the image will then wipe away.

In some applications, however, more permanent images are desired and can be formed by, e.g., incorporating one or more cross-linking components or layers into the construction. For example, a cross-linking promoter layer can be coated or printed on top of one or more layers of the water-activatable adhesives. Cross-linking could then be promoted by activation with the water in an ink jet ink, with the water carrying the cross-linking agents down into the water-activatable adhesive layer(s) as it migrates into the construction. Non-limiting examples of cross-linking promoters include zinc, aluminum, and zirconium salts, such as zinc acetate, zinc octoate, aluminum acetylacetonate, and zirconyl ammonium carbonate. Typically, anywhere from about 0.2 to about 2.0% by weight of such cross-linkers can be coated on the uppermost layer of the water-activatable adhesive layers to form a water-soluble cross-linker layer.

Figure 4:
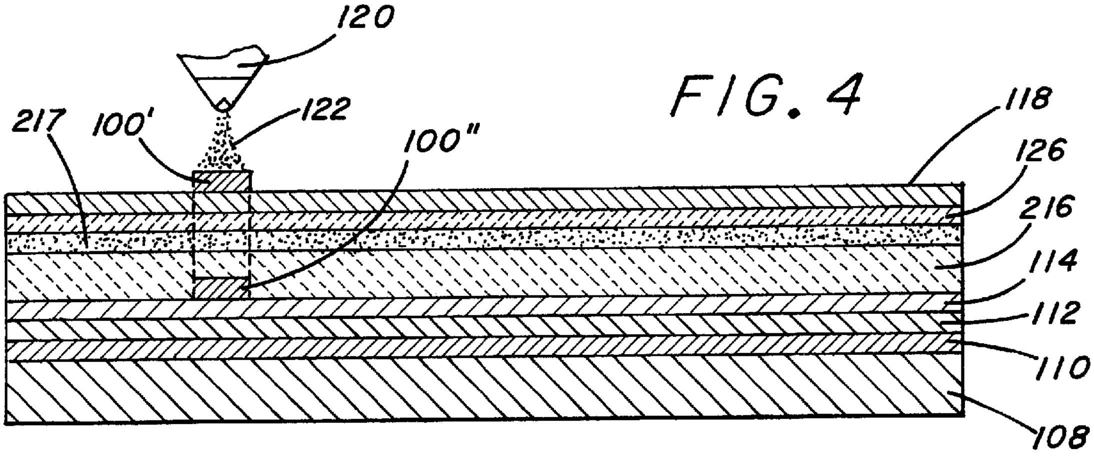
FIG. 4 is a cross-sectional view of another image transfer sheet for permanent transfer of images in which the adhesive layer becomes water-resisting after printing with a water based ink.

FIG. 4 illustrates an approach in which a thin layer of water-soluble cross-linker 126 is printed or coated on the exposed upper face surface of the adhesive layer 217. When the ink jet printer ink passes through the cross-linker layer 126, it is believed that the water-soluble cross-linker will dissolve upon contact with the ink as the ink flows through adhesive layer 217. The dissolved cross-linker will then migrate into the adhesive layer 216, and an image area 100" of ink, adhesive and cross-linker is formed. It is believed that the adhesive reacts with the cross-linker and becomes water-insoluble in the image area. The cross-linker may be a zinc acetate solution, an all-metal zirconium solution, or other suitable cross-linker. High temperatures are not required, because the reaction begins as soon as the adhesive comes into contact with the cross-linker. As in the embodiment of FIG. 2, the adhesive may be applied in two layers. In FIG. 4, there is an optional second layer of adhesive 217 that is printed or coated on the exposed outer surface of a first adhesive layer 216 in order to smooth the surface of the first adhesive layer 216. However, in most embodiments, this second, thin adhesive layer 217 may be omitted.

A second alternative is to mix a temperature-activated cross-linker into the adhesive layer itself, such that the cross-linker and the adhesive react under heat when heated to within a range of activation temperatures. An epoxy-functionalized monomer, such as glycidyl methacrylate (GMA), can be added to the monomer mixture used to prepare the water-activatable copolymers. Heat-activated cross-linking (at, e.g., about 250° F. or 120° C.) should result in a water-permanent, three-dimensional ("3D") matrix. A non-limiting example of cross-linking through epoxy-containing PSAs is found in U.S. Pat. No. 4,812,541 (Mallya et al.), which is incorporated herein by reference.

Alternatively, improved water-resistance can be targeted by including a fluoroacrylate monomer, such as trifluoroethyl methacrylate, in the monomer mixture. The resulting polymer, though water-activatable, should also be somewhat water-permanent.

Figure 5:
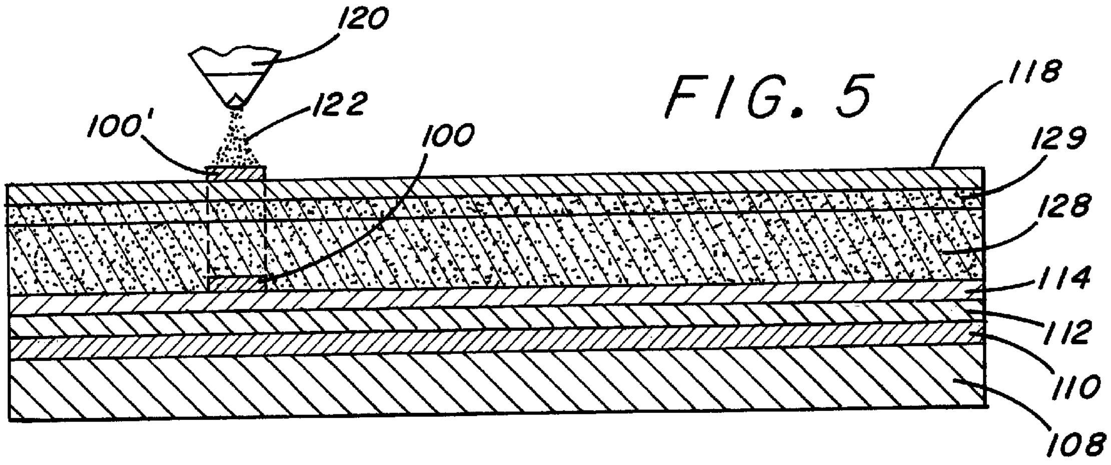
FIG. 5 is a cross-sectional view of another image transfer sheet in which the adhesive layer becomes water-resisting when sufficiently heated after printing.

FIG. 5 illustrates this arrangement, in which reference numeral 128 is a first, coated layer of adhesive/cross-linker and reference number 129 is a second, printed or coated layer of adhesive/cross-linker. In some embodiments, the adhesive/cross-linker may be applied as a single layer, rather than as two separate layers.

The preferred activation temperature is between about 180 to 250° F. (82 to 121° C.). The cross-linker does not react with the adhesive until the activation temperature range is reached. The transferred image, then, is a mixture of ink jet printer ink, adhesive and cross-linker. One way to make the image permanent, is to heat the object by exposing the transferred image to a heat source such as an oven, an iron, and the like.

One contemplated application for the embodiment is children's T-shirts. A child can design an image for a T-shirt on a home computer. The child then prints the image onto the sheet of FIG. 5 with an ink jet printer, and presses the printed sheet down onto a blank T-shirt. The image transfers onto the shirt and, after pulling the sheet away, the child can inspect the transferred image. If there is a problem with the transferred image (e.g., the color quality is not good, the image is not centered properly, etc.), the shirt can be placed into a washing machine and the imperfect image will be washed out of the shirt. On the other hand, if the child likes the image, the child can fix the image permanently to the T-shirt by having an adult iron the transferred image with an iron.

In the embodiments discussed so far, no heat has been required to transfer the image from the sheet to the substrate. The adhesive layer 129 acts both to hold the image and to transfer the image without heat. In the embodiment of FIG. 5, the image can be permanently fixed onto a substrate such as a T-shirt by applying heat after the image has been initially transferred.

Figure 6:
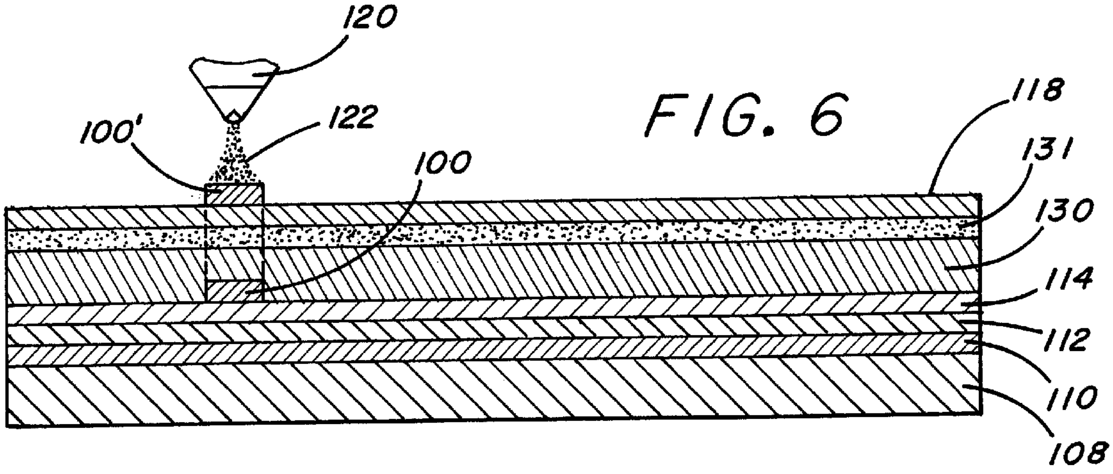
FIG. 6 is a cross-sectional view of another image transfer sheet having an adhesive layer for temporarily adhering the printed image to the substrate, and a special image-holding layer that becomes water-resisting when sufficiently heated after printing.

FIG. 6 discloses another embodiment in which the image transfers without heat, but is then fixed on the substrate when sufficient heat is applied. However, the functions of retaining the image and temporarily adhering the image to the substrate are performed by two separate layers. The embodiment of FIG. 6 includes a thin layer of water-accepting adhesive 130 (having a dry coat weight thickness of between about 1 to about 20 g/m$^2$, preferably of about 1 to about 10 g/m$^2$, more preferably from about 1 to about 5 g/m$^2$) that acts to hold the image to the substrate. A special coating 131 holds the image itself after printing. This coating should be capable of initially accepting the aqueous ink jet ink and, after heat treatment, should be capable of fixing the resulting image to provide water-fastness. One suitable coating is described in U.S. Pat. No. 5,271,990 to Kronzer et. al., which is incorporated by reference herein.

The aqueous ink 122 passes through and activates the water-accepting adhesive 131 as it flows into the special coating 130. The coating 130 is initially water-accepting. However, after exposing coating 130 to the water-based ink jet ink, and then applying sufficient heat from about 180 to about 300° F. (from about 82 to about 150° C.), the special coating layer 130 becomes water-resisting. That is, the special coating layer 130 is initially water-accepting but after the image has been printed and heat has been applied, the special coating layer 130 is water-resisting.

To take one example, when the printed sheet is initially applied to a substrate such as a T-shirt, the adhesive layer 130 holds the image in place on the shirt. At this point, once the shirt is washed in water, the image will wash-off. However, in the presence of sufficient heat (as from an iron) the coating 131 will permanently bond to the T-shirt fibers. Then the shirt can be washed, and the image will remain on the shirt.

A method of effecting image transfer with the sheet of FIG. 6, expressed in very practical terms, is as follows. The user first creates the image to be printed with an appropriate computer program. The user then prints the image onto the sheet of FIG. 6 using an ink jet printer. The user then transfers the image onto the shirt without an iron by pressing the printed sheet onto the shirt. If the user likes the appearance of the image on the shirt, the user can then use an iron to heat fix the image on the substrate. If the user does not like the image, the user can simply wash the shirt in a washing machine to wash the image away.

A METHOD OF MANUFACTURING THE SHEETS

A preferred method of manufacturing the various embodiments involves the use of a printing press to print successive layers onto the backing sheet. Typically, conventional adhesive coaters print a relatively thick layer of adhesive, whereas a number of the layers in the disclosed embodiments are quite thin. However, the layers can be alternatively printed, rather than coated, to be very thin.

The presently preferred method of manufacture employs flexographic ("flexo") printing stations. Flexographic printing techniques are well known in the printing industry. Detailed information regarding flexographic printing may be found in Flexography: Principles & Practices (4th Edition), which is hereby incorporated by reference and which may be ordered on the World Wide Web from the Flexographic Technical Association.

At each flexo station, there is a conventional flexo printer dryer. Consequently, immediately after a layer is printed, it is dried in the dryer associated with each flexo station. However, the adhesive layer is relatively thick in most of the embodiments, and an oven is needed to dry part or all of the adhesive layer.

Figure 7:
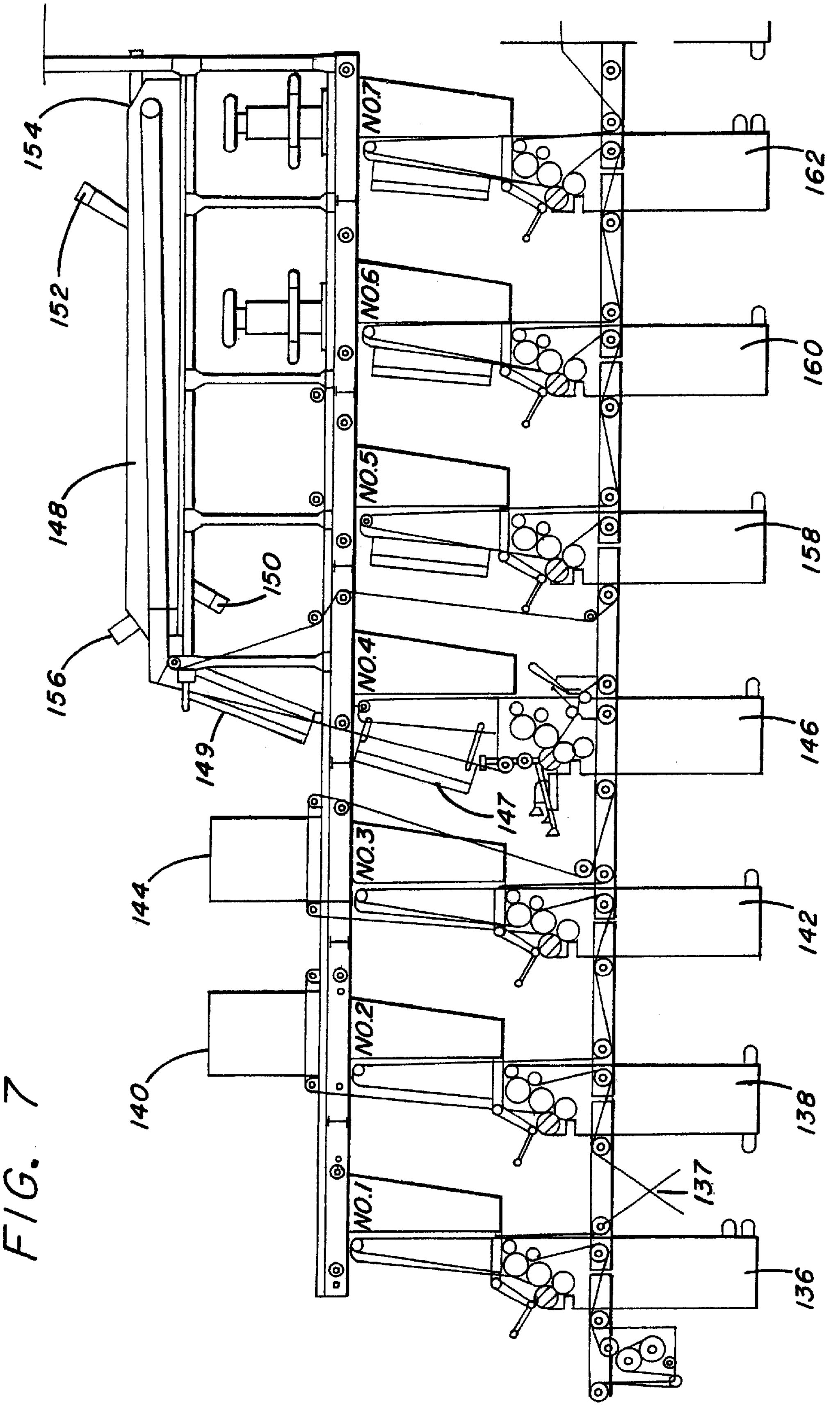
FIG. 7 illustrates one embodiment of a method of manufacturing the sheet of FIG. 2.

Referring to FIG. 7, and considering a method of manufacturing the embodiment of FIG. 2, web 134 is transported off of a roll (not shown) and routed to flexo printing station 136, where a product code and/or other information is printed onto one or both sides of the web. A variety of web sizes may be employed, but it is presently preferred to use conventional 11.5 in. (29.2 cm) wide rolls of paper.

As described previously, a webstock backing is chosen having a coating of polyethylene (available from Jencoat) on its upper exposed face surface. These PE-coated webstocks provide hold-out for the previously described first UV varnish layer. The first layer of UV varnish is coated on the PE surface of the polycoated webstock backing and then cured. A second UV varnish layer is then coated on the exposed surface of the first UV varnish layer, and the second UV varnish layer is then subsequently cured. It is desirable to have the second UV varnish somewhat incompatible with the first UV varnish to eliminate any anchorage of the first UV varnish layer to the second UV varnish layer, thus allowing the two layers to be cleanly and easily separated after both are cured. An adhesive layer is then applied to the exposed surface of the second UV varnish layer, and the adhesive layer is dried and/or cured. An optional detack layer can then be applied to the exposed first adhesive layer.

It may be alternatively desirable to print information on the lower exposed surface of the flexible webstock or backing layer where the printed indicia identifies the source of the product or the product itself. Once the information printed on the backside of the webstock is cured and/or dried, the web makes a 180 degree wrap at turn rods 137. The web then advances to a second flexo printing station 138 where the first layer of UV varnish 112 is printed. The web then proceeds to UV curing station 140, where the liquid UV varnish layer 112 is subsequently cured to form a solid film layer. Once the first UV varnish layer 112 is cured, the web then advances to a third flexo printing station 142 where a second UV varnish layer 114 is printed. The web then proceeds to UV curing station 144 where the second UV varnish layer 114 is cured. The first UV varnish layer 112 must tightly anchor to the PE hold-out layer 110 to prevent incomplete or undesirable transfer of the transferred image to the image-bearing substrate. Furthermore, the first UV varnish layer 112 and the second UV varnish layer 114 must be capable of being releasably separated from each other during the image transfer step.

The web then moves to a Meyer rod-coating station 146 at which the adhesive layer 116 is coated onto the sheet. Rod coaters are conventional in the coating art. An advantage of rod-coating station 146 is that it can lay down a relatively thick layer of adhesive while retaining control over the wet weight of the layer, irrespective of the viscosity of the adhesive. In the presently preferred embodiment, the Meyer rod-coating station 146 applies a wet adhesive coating thickness of approximately50 microns. The station 146 also includes one or more small heaters 147 and 149 having a heat output of approximately 2 kilowatts (kW) and low-flow muffin fans (not shown) to blow the heated air across the web. The web is thus preheated somewhat before entering the oven 148.

Adhesive layer 116 is typically relatively thick, and an oven 148 is employed to speed the drying process without exposing the web to excessive temperatures which may damage the coating. Care must be taken to ensure that the heat-sensitive embodiments of this invention are not activated at this step. Dehumidified air is then pumped into the oven as part of a special technique to reduce drying time and increase the production rate of the sheets while drying at relatively low oven temperatures. Typically, oven temperatures of 250° F. (121° C.) or less are employed. If air at ambient conditions is pumped into the oven from the area surrounding the oven, the air can be laden with moisture, particularly in humid climates. The presence of humid air in the oven increases the time necessary to dry the adhesive layer, as the greater the humidity of the air, the less additional moisture the air can absorb. Suppose, for example, but without limitation, that the ambient air has a humidity of 80%. Reducing the humidity of the air to 20% before the air enters the oven significantly improves the capacity of the air to dry the adhesive in the oven. This is especially true for drying at the low oven temperatures of 250° F. (121° C.) or less as described above. The dry, hot air then draws water out of the adhesive coating like a sponge. Reducing the drying time by dehumidifying the air that feeds into the oven correspondingly increases production capacity. Dehumidifiers are well known and are readily available from a number of suppliers, including Sears Roebuck and Company, among many others.

The web 134 enters the oven 148 at the upper portion of the oven entrance, travels the length of the oven, then flips 180 degrees to travel the length of the oven again in the opposite direction. The presently preferred oven utilizes heated-air convection to dry the adhesive layer 116. The oven is approximately 12 ft. (3.6 m) long, such that the web travels a path length of approximately 24 ft. (7.3 m) within the oven. Generally speaking, the adhesive layer 116 is wet as the web 134 initially enters the oven 148. If the heated air that the web first encounters is too hot and dry, the upper surface of the adhesive will tend to dry too quickly, forming a "skin" on the adhesive. This skin impedes the evaporation of water from within the adhesive layer 177, thereby increasing the drying time.

On the other hand, the adhesive layer 116 is substantially water-accepting, and it is difficult to adequately dry the layer. Consequently, after the adhesive layer 116 has been dried somewhat, it is preferable to increase the heat and/or to decrease the humidity of the air, since the potential for forming a "skin" on the adhesive is less than when the web first enters the oven.

To provide an advantageous air flow, hot dehumidified air enters the oven at 150. The air impinges at an angle to the web, the web having already been in the oven for some time and which is progressing toward the exit of the oven in the web direction. The air also flows in a "cross-flow" direction that is opposite to the web direction. Referring to FIG. 7, reference numbers 150 and 152 are inlets for heated air, and 154 and 156 are outlets. Air entering the oven at inlet 150 is typically dehumidified air, whereas air entering the oven at 152 may be either dehumidified or simply heated. In the presently preferred oven, the air at 152 is simply heated and not specially dehumidified. The outlet 154 may be opened to vent air out of the oven to prevent a high pressure region from building in the back of the oven that would impede the flow of air.

Whether or not air outlet 154 is opened, humid air will exit the oven at outlet 156 in the region where the web enters the oven. Heated air exiting the oven may be used to pre-heat air that will eventually enter the oven, using traditional pre-heating techniques known in the art.

The temperature in the oven should typically remain under 300° F. (150° C.) in order to prevent damage to the adhesive and other coatings. The presently-preferred temperature range is preferably between 180 to 250° F. (82 to 121° C.). In the presently preferred embodiment of the oven, the web travels through the oven at a rate of approximately 35 ft./min. (10.7 m/min.), although greater rates may ultimately be attained. At this rate, the web remains in the oven for less than about 1 min. In most ovens on a commercial image transfer sheet production line, the web will remain in the oven for a minimum of about 20 seconds, and generally will not need to remain in the oven for more than a minute. The drying time is rather flexible, however, and will depend on the particular oven, the temperature within the oven, and various other factors.

Various other types of ovens may be used to manufacture the sheets of the present invention. For example, Avery Dennison's U.S. Pat. No. 5,659,972, which issued on Aug. 26, 1997 and which is incorporated by reference herein, discloses a radio frequency (RF) assisted flotation air bar dryer apparatus which may be adapted for use in the present manufacturing method.

Once the first adhesive layer 116 has dried, the web is moved out of the oven and to flexo station 158 where a second layer of adhesive 117 is printed and dried by passing the web through an oven or heater. A purpose of the second layer of adhesive 117 is to smooth out any potential peaks and valleys in the surface of the coated adhesive layer 116 that may occur as a result of a poor manufacturing process.

Rod coaters are advantageous for coating a fairly thick layer of adhesive, but a flexo printer has the advantage of printing a thin layer having a smooth surface. The step of printing a second layer of adhesive reduces the roughness of the first adhesive layer by between approximately 50% to about 70%.

The wet, second layer of adhesive 117 may add some water to the adhesive 116, which is water-accepting. To help thoroughly dry both layers of adhesive, auxiliary heaters may be used at the flexo station 158 in addition to the usual dryer that is provided with the flexo printer. The presently preferred auxiliary heater has a heat output of less than about 10 kW. Generally speaking, care must be taken to prevent the web temperature from exceeding about 300° F. (150° C.) so that the adhesive coating layers are not damaged.

After flexo station 158, the web then advances to flexo station 160 where detack coating 118 is printed on the exposed upper face surface of adhesive layer 117 and dried. An optional printing station 162 may be employed to print indicia around the perimeter of the detack layer of the image transfer sheet. The web is then advanced to conventional cutting and stacking equipment (not shown). A slip sheet (not shown) may be introduced before or as the web feeds into the cutting and stacking equipment, so that the cut image transfer sheets are each separated by a piece of paper. This helps prevent the image transfer sheets from adhering to one another in storage. As an alternative to cutting and stacking individual transfer sheets, the web may be wound onto a roll or advanced to one or more additional stations for further processing.

The end-product ultimately reaches the consumer for printing an image thereon with a water-based ink. This printing step is typically performed with an ink jet printer, although the image may be printed with other conventional printing means that utilize water-based ink, including water-based ink pens, watercolor paints, and the use of various conventional printers to form the desired image.

This method is adaptable. To manufacture the embodiments of FIGS. 3 to 6, for example, an appropriate number of flexo stations and/or Meyer rod stations and/or other conventional stations are added to the production line to print and dry additional layers onto the sheet, when necessary.

The foregoing has described presently preferred embodiments of the invention, as well as alternative embodiments. However, it should be understood that the scope of the invention is not limited to what is described in the Specification. Numerous variations may be employed within the scope of the invention. For example, the adhesive may be altered in order to make the image more permanent and water-resistant. In one alternative embodiment, one of the two layers of adhesive would be replaced by a UV-curable adhesive. Instead of coating two layers of the above-described water-activatable adhesives, a UV-curable pressure-sensitive adhesive ("PSA") can be substituted for one of the water-activatable adhesive layers, adjacent to the second UV varnish layer. Once cured, it is believed that the UV-curable PSA layer should improve the water-fastness or permanence of the transferred image. Non-limiting examples of UV-curable PSAs are found in Avery Dennison's U.S. Pat. No. 5,686,504 (Ang), incorporated by reference herein. Other suitable UV-curable adhesives are available from National Starch and Chemical Co. of Bridgewater, N.J., H. B. Fuller Co. of St. Paul, Minn., and Reichhold Chemicals, Inc. of Research Triangle Park, N.C.

Another approach to cross-linking the adhesive to make the transferred image more water-resistant and durable is to add an epoxy resin to an adhesive layer. The adhesive layer would then be reacted to create a 3D matrix. Avery Dennison's U.S. Pat. No. 4,812,541 issued Mar. 14, 1989 to Mallya et al. and which is hereby incorporated by reference, discloses one such adhesive.

The various layers do not always need to fully cover the sheet. For example, the first and/or the second UV varnish layer may extend across only a portion of the width of the sheet, with the adhesive layer being wider than the first UV varnish layer. That way, the side edges of the adhesive layer will bond directly to the sheet and will not delaminate. In this way, the adhesive layer is anchored at its sides on the image transfer sheet. This prevents the adhesive layer from delaminating as a whole, and from separating at its edges from the image transfer sheet during storage. The anchored portion of the adhesive layer may be pre-colored in order to indicate to the user that an image should not be printed thereon.

Furthermore, the first and/or second UV varnish layers may be applied in a pattern, such that the adhesive layer is bonded to the image transfer sheet in predefined areas. The adhesive layer will then not separate from the image transfer sheet in those predefined areas. This limits the regions of the image transfer sheet that can serve to transfer images. Similarly, select portions of the image transfer sheet can be made available for image transfer, while other areas are not available for image transfer. This permits a two-step process for transferring multiple images onto a single substrate to create intricate, customized, and unique images. For example, a picture of a face might be printed onto a first image transfer sheet. The face design is then transferred to the image-bearing substrate. The printed mouth of the face design might be open and have no teeth. The user could then select his/her choice of teeth from a range of designs in a computer software program, print out the desired design with a printer onto a second image transfer sheet, then transfer the printed teeth design onto the open mouth of the face previously transferred to the substrate. Numerous variations can be imagined.

With respect to various additional applications for the present invention, very large images may be printed and transferred using a commercially available software program to create a single large image or to break up a single large image into 8.5 by 11 in. (21.6×28 cm) sheets, or other sheet sizes that can be printed in a standard ink jet printer. As one of many examples, a large beach scene of Hawaii can be broken up into several smaller images that are each printed onto an 8.5 by 11 in. (21.6×28 cm) sheet. Alternatively, the entire Hawaiian image may be printed on a single sheet using a large format digital printer, printing press or other suitable printing means. In the example where multiple sheets are printed out to form the image, the user applies the sheets to a wall or window in the proper order to form the beach scene.

In another embodiment, the image or images can be printed with custom-written or commercially available software that makes the image suitable for viewing with a Lenticular lens, with 3D glasses or with other special viewing devices.

Generally speaking, it will be desirable to print images and text in "reverse" onto the image sheet, so that the image and text is properly oriented after transfer. Computer software to print images and text in reverse is well-known in the relevant art. However, the user may sometimes prefer not to reverse-print an image or text for some applications.

There are many applications for the various embodiments in which the image holding layer is initially water-accepting but which then becomes water-resisting, such as the embodiments of FIGS. 4–6. In addition to the many examples already presented, another example relates to printing photographs. A photographic image can be printed with an ink jet printer onto an image transfer sheet. The photographic image can then be applied to any of a very wide variety of different surfaces including, but not limited to, the surfaces listed in Table 1. Once the image-holding, water-accepting layer becomes water-resisting, the photograph becomes "smudge-proof".

As a further alternative, embodiments may be developed in which the printed image is never actually transferred to another substrate. Instead, the image is permanently retained on the image transfer sheet, which may be constructed so that the adhesive layer is not removable from the underlying sheet. As one of many examples, an embodiment may be constructed with a transparent backing onto which an adhesive layer such as 116 (FIG. 1) is applied. The user could then print an image onto the sheet with an ink jet printer, thereby activating the adhesive. After printing, the user would apply another transparent sheet upon the activated adhesive to form a holiday ornament, "stained glass" style window, or the like in which the printed image is visible from either side of the end product. Many other applications can be readily imagined.

Another alternative is to die-cut the adhesive layer and/or other layers into small, discrete zones in order to improve image transferability.

Accordingly, the present invention is not limited precisely to the arrangements as shown in the drawings and as described in detail hereinabove.

What is claimed is:

1. A method of manufacturing image transfer sheets comprising the steps of:

applying a layer of water-activatable adhesive onto a flexible substrate;

after applying a layer of water-activatable adhesive onto a flexible substrate, drying said layer of adhesive in a dryer with heat and dehumidified air; and applying a water permeable detack layer atop said layer of adhesive.

2. A method as defined in claim 1 wherein said method further comprises the step of applying a water-impermeable layer to said flexible substrate prior to the step of applying a layer of water-activatable adhesive onto said flexible substrate, said water-impermeable layer being in between said substrate and said adhesive layer.

3. A method as defined in claim 2, wherein said water-impermeable layer is a UV cured film.

4. A method as defined in claim 2 wherein said method further comprises the step of applying a release coating to said flexible substrate prior to the step of applying a water-impermeable layer.

5. A method as defined in claim 4 wherein said release coating is a UV cured film.

6. A method as defined in claim 1 wherein said detack layer comprises one or more of the group constituting polyvinyl alcohol (PVOH), polyacrylic acid (PAA), and starch.

7. A method as defined in claim 6, wherein said detack layer comprises polyvinyl alcohol, polyacrylic acid and starch.

8. A method as defined in claim 1 further comprising the step of applying at least one of the following water permeable layers: a pigmented layer, a colored layer, a tinted layer, and a reflective layer

9. A method as defined in claim 1 wherein said step of applying a layer of adhesive comprises printing a layer of adhesive with a printing press.

10. A method as defined in claim 1 wherein said layer of adhesive is a first layer of adhesive and wherein the method further comprises applying a second layer of adhesive onto said first layer of adhesive.

11. A method as defined in claim 10 wherein said first layer of adhesive is a relatively thick layer of adhesive and wherein said second layer of adhesive is a relatively thin layer of adhesive that is applied with a printing press on said first layer of adhesive.

12. A method as defined in claim 1 wherein the step of applying a detack layer comprises printing the detack layer with a printing press.

13. A method as defined in claim 1, wherein the method further comprises applying a layer of cross-linker, wherein ink jet ink passing through said layer of cross-linker and into said adhesive layer mixes with said cross-linker and carries it into said layer of adhesive.

14. A method as defined in claim 1, wherein said layer of adhesive further comprises a cross-linker.

15. A method of manufacturing image transfer sheets comprising the steps of:

applying a water-impermeable layer onto a release-coated, flexible substrate;

applying a water-activatable adhesive layer onto the water-impermeable layer; and applying a water permeable detack layer onto said layer of adhesive.

16. A method as defined in claim 15, wherein said water-impermeable layer is a UV curable coating, and wherein the method further comprises the step of UV curing said UV curable coating.

17. A method as defined in claim 15 wherein said release coating is a UV curable coating, and wherein the method further comprises the step of UV curing said release coating.

18. A method as defined in claim 15 wherein said detack layer comprises one or more of the group comprising polyvinyl alcohol (PVOH), polyacrylic acid (PAA), and starch.

19. A method as defined in claim 15, wherein said detack layer comprises polyvinyl alcohol, polyacrylic acid and starch.

20. A method as defined in claim 15 wherein at least one of said layers is applied with a printing press.

21. A method as defined in claim 15 wherein said layer of adhesive is a first layer of adhesive and wherein the method further comprises applying a second layer of adhesive atop said first layer of adhesive.

22. A method as defined in claim 21 wherein said first layer of adhesive is a relatively thick layer of adhesive that is applied with a coater and wherein said second layer of adhesive is a relatively thin layer of adhesive that is applied with a printing press atop said first layer of adhesive.

23. A method as defined in claim 21 wherein said first layer of adhesive when applied has a wet adhesive coating weight of about 30 to about 60 $g/m^2$ and said second layer of adhesive when applied has a wet adhesive coating weight of about 2 to about 10 $g/m^2$.

24. A method as defined in claim 21 wherein at least one of said layers is applied with a printing press.

25. A method as defined in claim 15, wherein the method further comprises applying a layer of cross-linker.

26. A method as defined in claim 15, wherein said layer of adhesive further comprises a cross-linker.

27. A method as defined in claim 15 wherein after the step of applying the layer of adhesive, the method further comprises drying the adhesive layer in a dryer into which dehumidified air is provided.

28. A method as defined in claim 15 wherein the method further comprises applying an initially water-accepting image-holding layer in between said adhesive layer and said water-impermeable layer, said image-holding layer becoming water-resisting when heated to within a range of activation temperatures.

29. A method of manufacturing image transfer sheets comprising the steps of:

applying a layer of water-activatable adhesive onto a flexible substrate;

after applying a layer of water-activatable adhesive onto a flexible substrate, drying said layer of adhesive in a dryer with heat and dehumidified air;

applying a water permeable detack layer atop said layer of adhesive; and applying a water-impermeable layer to said flexible substrate prior to the step of applying a layer of water-activatable adhesive onto said flexible substrate, said water-impermeable layer being in between said substrate and said adhesive layer.

30. A method as defined in claim 29, wherein said water-impermeable layer is a UV cured film.

31. A method as defined in claim 29, wherein said method further comprises the step of applying a release coating to said flexible substrate prior to the step of applying a water-impermeable layer.

32. A method as defined in claim 31, wherein said release coating is a UV cured film.

33. A method as defined in claim 29, wherein said detack layer comprises one or more of the group constituting polyvinyl alcohol (PVOH), polyacrylic acid (PAA), and starch.

34. A method as defined in claim 33, wherein said detack layer comprises polyvinyl alcohol, polyacrylic acid and starch.

35. A method as defined in claim 29, further comprising the step of applying at least one of the following water permeable layers: a pigmented layer, a colored layer, a tinted layer, and a reflective layer.

36. A method as defined in claim 29, wherein said step of applying a layer of adhesive comprises printing a layer of adhesive with a printing press.

37. A method as defined in claim 29, wherein said layer of adhesive is a first layer of adhesive and wherein the method further comprises applying a second layer of adhesive onto said first layer of adhesive.

38. A method as defined in claim 37, wherein said first layer of adhesive is a relatively thick layer of adhesive and wherein said second layer of adhesive is a relatively thin layer of adhesive that is applied with a printing press on said first layer of adhesive.

39. A method as defined in claim 29, wherein the step of applying a detack layer comprises printing the detack layer with a printing press.

40. A method as defined in claim 29, wherein the method further comprises applying a layer of cross-linker, wherein ink jet ink passing through said layer of cross-linker and into said adhesive layer mixes with said cross-linker and carries it into said layer of adhesive.

41. A method as defined in claim 29, wherein said layer of adhesive further comprises a cross-linker.

42. A method of manufacturing image transfer sheets comprising the steps of:

releasably applying a layer of water-activatable adhesive onto a flexible substrate, wherein the layer of water-activatable adhesive is removable from the substrate;

after applying a layer of water-activatable adhesive onto a flexible substrate, drying said layer of adhesive in a dryer with heat and dehumidified air; and applying a water permeable detack layer atop said layer of adhesive.

* * * * *